A. E. LIPP.
CAMERA.
APPLICATION FILED DEC. 29, 1917.

1,388,870.

Patented Aug. 30, 1921.
3 SHEETS—SHEET 1.

Inventor:
Albert E. Lipp,
by A. V. Groth
Attorney.

A. E. LIPP.
CAMERA.
APPLICATION FILED DEC. 29, 1917.
1,388,870.
Patented Aug. 30, 1921.
3 SHEETS—SHEET 2.
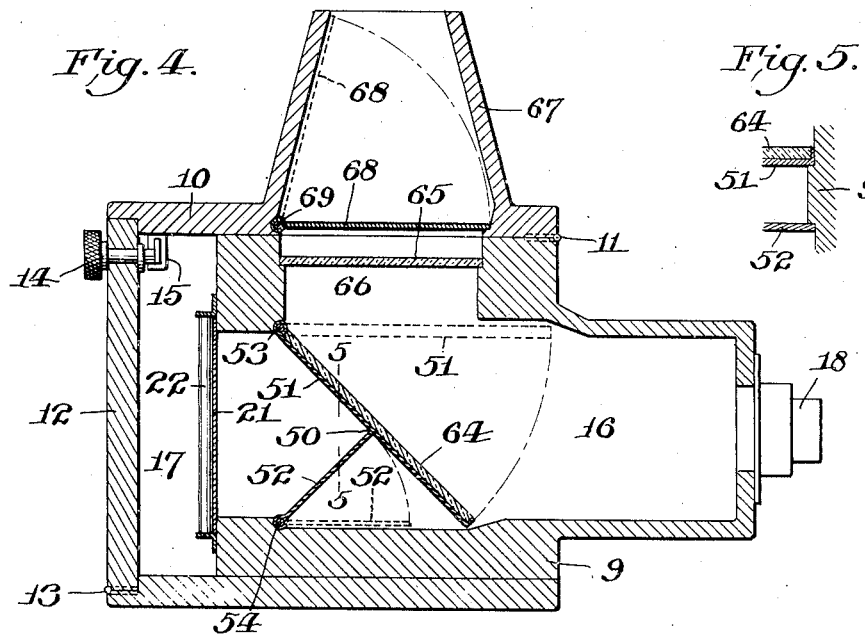
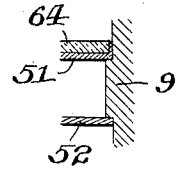
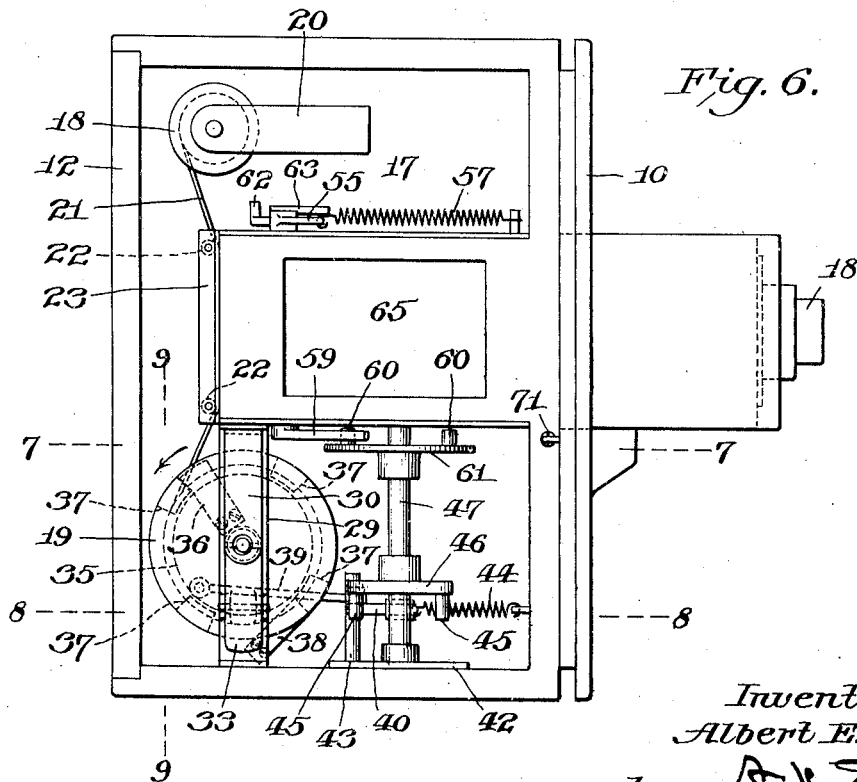
Inventor:
Albert E. Lipp,
by
Attorney.

A. E. LIPP.
CAMERA.
APPLICATION FILED DEC. 29, 1917.

1,388,870.

Patented Aug. 30, 1921.

Inventor:
Albert E. Lipp,
by
Attorney.

UNITED STATES PATENT OFFICE.

ALBERT E. LIPP, OF PHILADELPHIA, PENNSYLVANIA.

CAMERA.

1,388,870.  Specification of Letters Patent.  Patented Aug. 30, 1921.

Application filed December 29, 1917. Serial No. 209,387.

*To all whom it may concern:*

Be it known that I, ALBERT E. LIPP, a citizen of the United States, residing at Philadelphia, in the county of Philadelphia and State of Pennsylvania, have invented certain new and useful Improvements in Cameras, of which the following is a specification.

My invention relates to improvements in photographic cameras, and the object of my invention is to provide a camera with a novel, simple and efficient means whereby, by the operation of a single part, an exposure shutter may be opened and closed, a film may be advanced to present a fresh portion thereof for exposure, a focusing mirror may be moved to and from a focusing position and a shutter arranged to open and close, a focusing hood may be moved to open and close the same, to the end that images may be focused and exposures made in rapid succession.

With the above and related objects in view, my invented camera consists of the elements and the combinations of them hereinafter fully described and particularly claimed.

In the accompanying drawings illustrating my invention,

Fig. 4 is a central section through the camera, on line 4—4 of Fig. 1.

Fig. 5 is a sectional detail of the exposure shutter, on line 5—5 of Fig. 4.

Fig. 6 is a plan of the camera, showing the hinged top wall in the open position.

Figure 1:
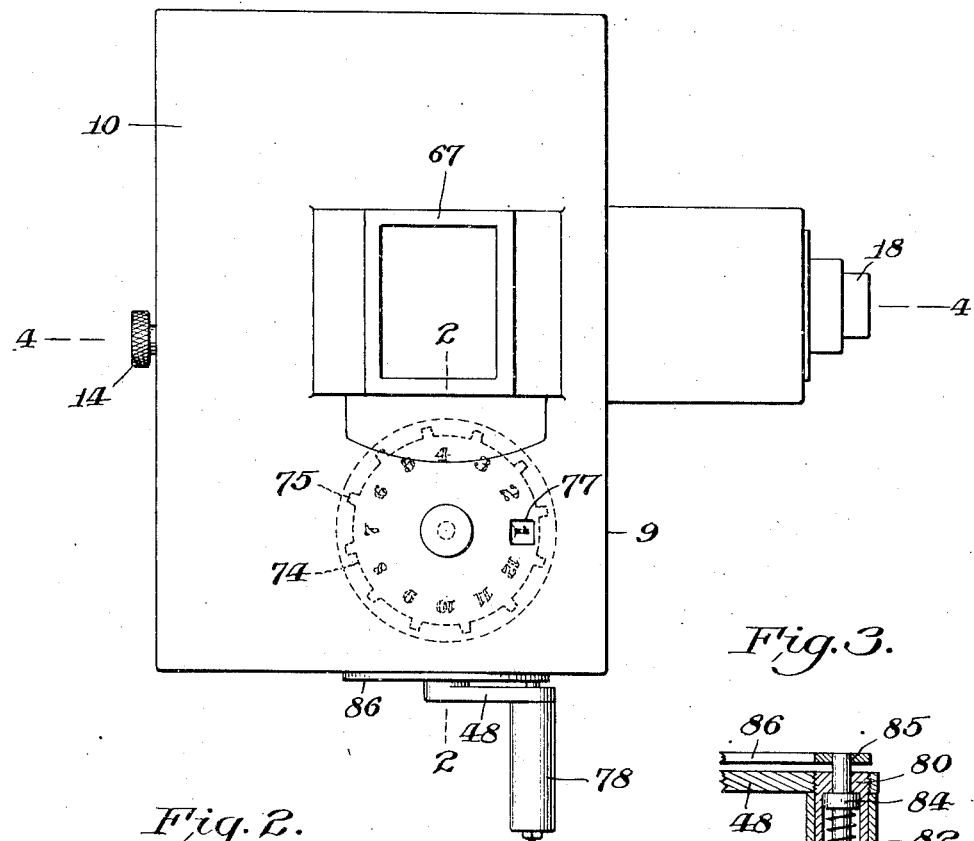
Figure 1 is a plan of a camera embodying my invention.
Figure 2:
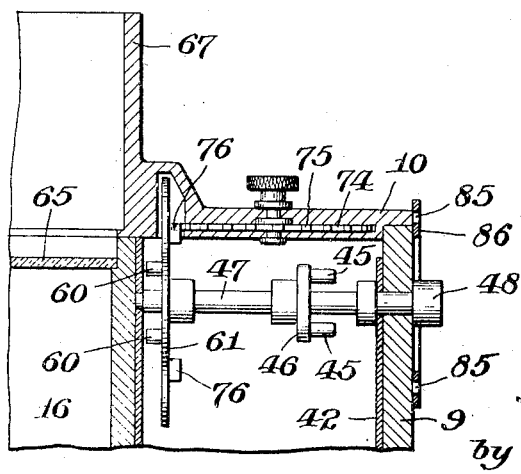
Fig. 2 is a sectional detail on line 2—2 of Fig. 1, showing the registering device.
Figure 3:
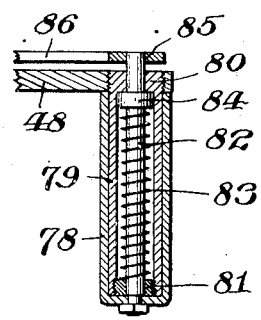
Fig. 3 is a sectional detail of the crank handle.
Figure 7:
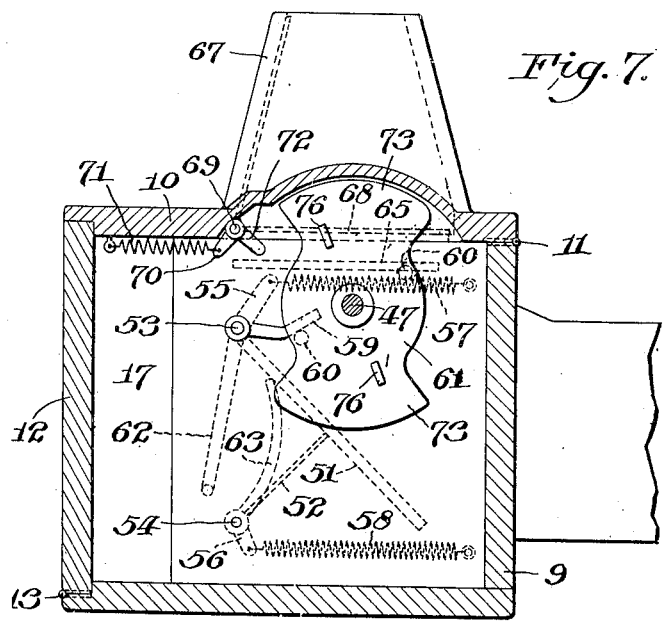
Figure 8:
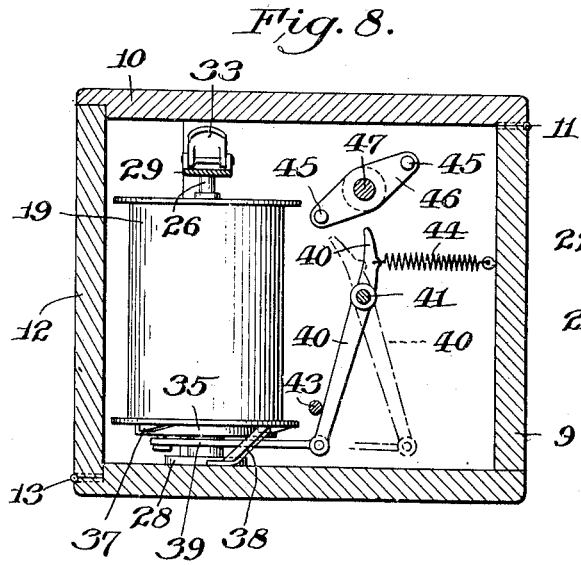
Figure 9:
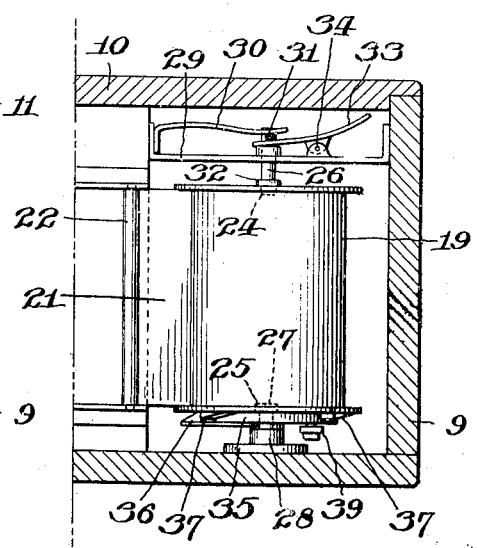

Figs. 7, 8 and 9 are sections through the camera, on lines 7—7, 8—8 and 9—9, respectively, of Fig. 6, showing the hinged top wall in the closed position.

Figure 10:
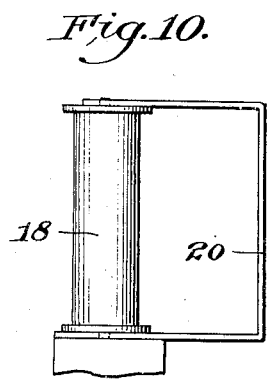

Fig. 10 is a detail showing the film supply roll and the spring bracket for supporting the same.

Referring to the drawings, 9 designates the camera casing provided with a top wall 10, having its forward edge hinged, at 11, to the main body of the casing 9, and provided also with a rear wall 12 having its lower edge hinged, at 13, to the main body of the casing 9. By opening the top and back walls 10 and 12 on their hinges, access may be had to the interior of the casing. The walls 10 and 12 are held in the closed position by a suitable catch 14 carried by the wall 12 and adapted to be engaged with and disengaged from a plate 15 on the adjacent edge of the wall 10.

The casing 9 incloses an exposure chamber 16 and a film chamber 17. The forward wall of the exposure chamber 16 carries a lens frame 18 which is provided with the usual lens for the admission of light to the chamber 16 in making an exposure. Located within the chamber 17 is a film supply roll 18 and a film take-up roll 19. The trunnions of the supply roll 18 are mounted to turn in suitable bearings in a spring frame 20 which permits the insertion or removal of the roll 18 when desired. A strip of photographic film 21 is drawn from the roll 18 and between the rearward wall of the exposure chamber 16 and two rollers 22 mounted to turn in brackets 23 thereon. The rollers 22 are located on the respective sides of the open rearward end of the exposure chamber 16 which is closed by the film 21 passing between the rollers 22, so as to present that portion of the film 21 which extends between the rollers 22 for exposure when light is admitted thereto through the lens in the frame 18. The film 21 passes from the rollers 22 to and is wound upon the take-up roll 19.

The top and bottom of the roll 19 is provided with central sockets 24 and 25 into which upper and lower pins 26 and 27, respectively, extend and on which the roll 19 turns. The lower pin 27 is carried by a bracket 28 on the floor of the casing 9 and the upper pin 26 is slidable vertically in a bearing in a bracket 29 which is secured within the casing 9. The pin 26 is pressed down into the socket 24 by a flat spring 30, one end of which is secured to the bracket 29, and the other end of which bears upon a pin 31 which extends transversely through the pin 26. A collar 32 on the pin 26 engages the top of the roll 19 and limits the downward movement of the pin 26. The pin 26 is adapted to be raised from the socket 24 by a hand lever 33 which is fulcrumed at 34 on the bracket 29 and which extends beneath the transverse pin 31. By depressing the upwardly extending arm of the lever 33, the pin 26 may be raised from the socket 24 to permit the roll 19 to be removed from or applied to the pins 26 and 27, as desired.

Turning freely on the pin 27 beneath the take-up roll 19 is a horizontal wheel 35 carrying a spring pawl 36 which is adapted to engage spaced ratchet teeth 37 on the bottom of the roll 19 and advance it to wind the film 21 thereon, when the wheel 35 is turned in the direction of the arrow in Fig. 6. The ratchet teeth 37 are properly beveled to cause the engaging end of the pawl 36 to spring downwardly from its normal position in the plane of the teeth 37 when the wheel 35 is turned in the reverse direction. A spring arm or pawl 38 is secured to casing floor and arranged to engage the teeth 37 and prevent the movement of the roll 19 with the wheel 35 when it is moved in said reverse direction.

One side of the wheel 35 is pivotally connected to one end of a rod 39, the other end of which is pivoted to the lower end of a lever 40 which is fulcrumed on a pin 41 projecting from a plate 42 secured within the casing 9. The lower arm of the lever 40 is held normally against a pin 43 projecting from the plate 42 by a spring 44, one end of which is attached to the upper arm of the lever 40 and the other end of which is attached to the casing 9, as shown. The upper arm of the lever 40 is adapted to be acted upon by spaced pins 45 carried by a head 46 secured on a shaft 47 which extends above and parallel with the pivot pin 41 and which is mounted to turn in suitable bearings in the casing 9. One end of the shaft 47 extends to the exterior of the casing 9 and is provided with a suitable hand crank 48 by means of which it may be turned. When the crank 48 is turned the pins 45 on the head 46 engage successively the upper arm of the lever 40 and move it to the dot-and-dash line position shown in Fig. 8 against the action of the spring 44 and then release the same, the spring returning the lever 40 to the full line position, after each release. Each time the lever 40 is moved to the dot-and-dash line position, the pawl 36 engages a tooth 37 and turns the roll 19 a distance equal to the distance between two teeth 37; and each time the lever 40 is returned to the full line position, the pawl 36 is moved back into position to engage the next succeeding tooth 37. Thus the film 21 is drawn from the roll 18 and wound upon the roll 19; and, at each forward operation of the pawl 36, a fresh section of the film 21 is presented to the exposure chamber 16 for exposure.

The exposure chamber 16 is provided with a shutter 50 which normally prevents light, entering through the camera lens, from reaching the film 21, and which comprises a long wing 51 and a short wing 52 which are secured to and project from pivot shafts 53 and 54, respectively, which are mounted to turn in the side walls of the exposure chamber 16. The long wing 51 is inclined downwardly and forwardly from the shaft 53, and the short wing 52 in inclined forwardly and upwardly from the shaft 54, and meets and engages the back of the long wing 51, when the shutter 50 is closed, as clearly shown by full lines in Fig. 4. The shafts 53 and 54 extend into the film chamber 17 and are provided with projecting arms 55 and 56 which are acted upon by springs 57 and 58, respectively, which maintain the wings normally in the full line position shown in Fig. 4 and thereby maintain the exposure shutter 50 closed. The springs 57 and 58 are attached to the arms 55 and 56, respectively, and to pins projecting from the side walls of the exposure chamber 16; and the wings 51 and 52 are adapted to be moved against the action of the springs 57 and 58, to the dotted line position shown in Fig. 4, to open the shutter 50, in making an exposure.

The shaft 53 is provided with an arm 59 which, when the shutter 50 is closed, is in the path of two pins 60 which project from a wheel 61 carried by the shaft 47, hereinbefore referred to, whereby, when the shaft 47 is turned, the pins 60 will successively engage the arm 59 and move the wing 51 to the open or dotted line position, and thereafter release the same and permit the spring 57 to return the wing 51 to the closed or full line position.

The shaft 53 is also provided with an arm 62 which, when the shaft 47 is turned to move the wing 51 to the open position, will engage an arm 63 projecting from the shaft 54 and move the wing 52 to the open or dotted line position, and which, when the wing 51 is returned to the closed position by the spring 57, will permit the spring 58 to return the wing 52 to the closed position.

It will be observed that, when the shutter 50 is closed, the arm 62 is spaced from the arm 63. The purpose of this arrangement is to permit the wing 51 to be raised to bring its free edge to or near the central line of exposure, before the free edge of the short wing 52, which is normally at said central line, begins to move downwardly, during the opening of the shutter 50 and to permit the reversal of this operation, during the closing of the shutter 50, for a uniform exposure.

The long wing 51 of the exposure shutter 50 carries a focusing mirror 64 arranged to reflect the image upon a focusing screen 65 of ground glass or other suitable material. The screen 65 is supported within a focusing opening 66 in the top wall of the exposure chamber 16, as clearly shown in Fig. 4. Arranged above the focusing opening 66, and carried by the hinged top wall 10 of the camera casing 9, is a focusing hood 67 through which the image may be seen upon the screen 65, in the usual well known manner, during the focusing operation. When the shutter 50 is opened to make an exposure, the focusing mirror 64 is moved upwardly face foremost as distinguished from edgewise with the shutter wing 51 to the dotted line position and out of the path of the light rays from the camera lens; and when the shutter 50 is closed, the mirror 64 is thereby returned to the focusing position, shown by full lines in Fig. 4.

To prevent light from entering the exposure chamber 16 through the hood 67, screen 65 and focusing opening 66, I provide the top casing wall 10 or hood 67 with a reciprocative shutter 68, secured on a pivot shaft 69 and adapted to be reciprocated on the axis of the shaft 69 to move the face foremost as distinguished from edgewise to and from the closed position shown by full lines in Fig. 4 to exclude light from the exposure chamber 16, when in the closed or full line position, and to permit the image to be seen upon the screen 65, when in the position shown by dotted lines.

The pivot shaft 69 of the shutter 68 is mounted to turn in the top wall 10 of the casing 9, and it is provided with an arm 70 which is acted upon by a spring 71, one end of which is attached thereto and the other end of which is attached to a pin projecting from the casing wall 10. The shutter 68 is adapted to be moved against the action of the spring 71 from the full line to the dotted line position shown in Fig. 4, and, when so moved and released, the spring 71 returns the shutter 68 to the full line or closed position. The shaft 69 is also provided with an arm 72 having its projecting end arranged in the path of movement of two cams 73 projecting from the wheel 61, hereinbefore mentioned; and the cams 73 are shaped to engage the arm 72, move the shutter 68 to the open position, hold it in the open position, and then release it and permit the spring 71 to return the shutter 68 to the closed position, as the cams 73 engage the arm 72 successively, during the rotation of the shaft 47 and wheel 61, for the opening and closing of the exposure shutter 50, the timing of the operation of the parts being such that the shutter 68 remains closed during the opening and closing of the exposure shutter 50.

Each time the crank 48 and therewith the shaft 47 is turned a complete revolution, two exposures are made and the film 21 is advanced therefor; and, in order that the photographer may know at all times the number of exposures that have been made, I provide a registering wheel 74 which is mounted to turn in the hinged top wall 10 of the casing 9, and which is provided with projecting teeth 75 adapted to be engaged by the two projections 76 which are carried by the wheel 61. Each time an exposure is made, a projection 76 engages a tooth 75 and advances or turns the wheel 74 a distance equal to the distance between two teeth 75. The upper face of the wheel 74 is provided with consecutive numerals which correspond in number with the teeth 75 and which are successively brought into registry with an opening 77 in the wall 10 and exposed to view therethrough, as the exposures are successively made, thereby registering and indicating at all times the number of exposures that have been made.

To arrest the turning movement of the crank 48, at certain stages, during the operation of the camera, and hold it in its arrested positions, for purposes hereinafter explained, I provide the following:

The crank handle 78 surrounds and is longitudinally slidable on a tubular stem 79 which is screwed into and projects from the crank 48, and which is provided with end heads 80 and 81. Extending centrally through the stem 79, and penetrating its end heads 80 and 81, is a pin 82 which is longitudinally slidable therein. The outer end of the pin 82 is secured to the outer end of the handle 78 so that the pin 82 may be moved by the handle. The pin 82 and handle 78 are held normally in the inward position by a spring 83 which encircles the pin 82 within the stem 79 between the end head 81 and a collar 84 secured on the pin 82. The inner end of the pin 82 is pressed by the spring 83 inwardly beyond the inner face of the crank 48, and the inner end is adapted to enter spaced openings 85 in a plate 86 secured to the casing 9. When, during the movement of the crank 48, the pin 82 comes into registry with one of the openings 85, the spring 83 automatically projects the pin 82 into the opening 85 and thereby arrests the movement of the crank 48. The openings 85 are so spaced with relation to the shutter opening and closing devices that the movement of the crank 48 will be arrested after each operation thereof to close the focusing shutter 68 and open the exposure shutter 50, and after each operation to close the exposure shutter 50 and open the focusing shutter 68.

The operation, briefly described, is as follows:

A supply roll 18 having the usual photographic film thereon is applied to the spring frame 20 and drawn between the back of the exposure chamber 16 and the rollers 22 and started around the take-up roll 19. The crank 48 is then turned to cause one of the cams 73 to engage the arm 72 and open the focusing shutter 68, stopping the movement of the crank 48 with its stop pin 82 engaging in one of the openings 85 in the plate 86. In this position of the parts, the focusing mirror 64 is in focusing position, and the image is thereby reflected upon the screen 65 in a manner to permit the photographer to focus the image as usual. This done, the handle 78 is operated to withdraw the pin 82 from the engaged opening 85 and to then turn the crank 48 until the exposure shutter 50 is opened. During this movement of the crank 48, the cam 73 escapes the arm 72 and permits the spring 71 to close the focusing shutter 68, and the parts then occupy the position shown in the drawings; and immediately thereafter one of the pins 60 engages the arm 59 and opens the exposure shutter 50. After the shutter 50 remains open the proper length of time for the exposure being made, the handle 78 is again operated to turn the crank 48 until the pin 82 engages the next succeeding opening 85. During the beginning of this last named movement of the crank 48, the pin 60 escapes the engaged arm 59 and permits the springs 57 and 58 to close the exposure shutter 50 and return the focusing mirror 64 to focusing position, and. immediately thereafter, one of the cams 73 engages the arm 72 and opens the focusing shutter 68 for a succeeding focusing operation, as previously explained. Immediately after the closing of the exposure shutter 50, and during the completion of said last named crank operation, one of the pins 45 engages and escapes the lever 40 and operates the pawl 36 to turn the take up roll 19 sufficiently to present a fresh portion of the film 21 to the exposure chamber 16 for the next exposure, and to permit the spring 44 to return the pawl 36 to the position shown in the drawings for the next film advancing operation. It will thus be understood that as the crank 48 is turned by hand and comes to rest with its stop in 82 engaged with the openings 85 successively, the crank will be stopped with the exposure shutter 50 open and closed in alternate succession for the proper timing of the successive exposures, that the film 21 will be advanced for the next succeeding exposure each time the exposure shutter 50 remains closed, that the focusing mirror 64 will be moved into focusing position each time the exposure shutter 50 is closed, and moved from its focusing position and out of the path of light rays from the camera lens, each time the exposure shutter 50 is opened, and that focusing shutter 68 will be opened each time the exposure shutter is closed, and closed each time the exposure shutter is opened, so that the camera may be manipulated to focus images and make exposures thereof in rapid succession and by the operation of a single part.

Each time the crank 48 is turned to make an exposure, a projection 76 on the wheel 61 engages a tooth 75 of the wheel 74 and advances the wheel 74 to bring the next succeeding numeral thereon into registry with the opening 77 to thereby register the exposure.

I claim:—

1. In a camera, the combination of a casing having an exposure chamber therein, a focusing mirror movable to and from a focusing position, a part coöperating with said mirror and thereby forming an exposure shutter, a movable operating part, and means operated by said part when moved to open said shutter and move said mirror from its focusing position.

2. In a camera, the combination of a casing having an exposure chamber therein, two pivoted wings forming an exposure shutter, a focusing mirror carried by one of said wings movable to and from a focusing position when said shutter is closed and opened, a movable operating part, and means operated by said part when moved to move said wings close said shutter and to move said mirror to its focusing position.

3. In a camera, the combination of a casing having an exposure chamber therein, two pivoted wings forming an exposure shutter, a focusing mirror carried by one of said wings movable to and from a focusing position when said shutter is closed and opened, a movable operating part, and means operated by said part when moved to move said wings open and close said shutter and to move said mirror from and to its focusing position during the opening and closing of said shutter, said shutter being closed when said mirror is in its focusing position.

4. In a camera, the combination of a casing having an exposure chamber therein, a reciprocative focusing mirror movable face foremost to and from a focusing position, a focusing hood, a shutter for opening and closing said hood, a rotatable operating part, and means operated by said part when rotated to open said shutter and move said mirror to its focusing position.

5. In a camera, the combination of a casing having an exposure chamber therein, a reciprocative focusing mirror movable face foremost to and from a focusing position, a focusing hood, a shutter for opening and closing said hood, a rotatable operating part, and means operated by said part when rotated to close said shutter and move said mirror from its focusing position.

6. In a camera, the combination of a casing having an exposure chamber therein, a reciprocative focusing mirror movable face foremost to and from a focusing position. a focusing hood, a shutter for opening and closing said hood, a rotatable operating part, and means operated by said part when rotated to open and close said shutter and to reciprocate said mirror and thereby move it to and from its focusing position, said shutter being open when said mirror is in its focusing position.

7. In a camera, the combination of a casing having an exposure chamber therein, a focusing mirror movable to and from a focusing position, an exposure shutter, a focusing hood, a reciprocative shutter movable face foremost to and from a position closing said hood, a rotatable operating part, and means operated by said part when rotated to close the last named shutter, move said mirror from its focusing position and open said exposure shutter.

8. In a camera, the combination of a casing having an exposure chamber therein, a focusing mirror movable to and from a focusing position, an exposure shutter, a focusing hood, a reciprocative shutter movable face foremost to and from a position closing said hood, a rotatable operating part, and means operated by said part when rotated to close the last named shutter, move said mirror from its focusing position and open and close said exposure shutter.

9. In a camera, the combination of a casing having an exposure chamber therein, a focusing mirror movable to and from a focusing position, an exposure shutter, a focusing hood, a reciprocative shutter movable face foremost to and from a position closing said hood, a rotatable operating part, and means operated by said part when rotated to open the last named shutter, move said mirror to its focusing position and close said exposure shutter.

10. In a camera, the combination of a casing having an exposure chamber therein, a focusing mirror movable to and from a focusing position, an exposure shutter, a focusing hood, a reciprocative shutter movable face foremost to and from a position closing said hood, a rotatable operating part, and means operated by said part when rotated to open and close the last named shutter, move said mirror to and from its focusing position and open and close said focusing shutter, said mirror being out of focusing position and the second named shutter being closed when said exposure shutter is open.

11. In a camera, the combination of a casing having an exposure chamber therein, a focusing mirror movable to and from a focusing position, a focusing hood, a shutter for opening and closing said hood, a movable operating part, and means operated by said part when moved to open and close said shutter and to move said mirror to and from its focusing position in alternate succession, said mirror being idle during the opening and closing of said shutter.

In testimony whereof I affix my signature hereto.

ALBERT E. LIPP.